(12) United States Patent
Aksman

(10) Patent No.: US 10,795,889 B2
(45) Date of Patent: Oct. 6, 2020

(54) QUERY PATH WITH AGGREGATE PROJECTION

(71) Applicant: ENTIT Software LLC, Sunnyvale, CA (US)

(72) Inventor: Natalya Aksman, Cambridge, MA (US)

(73) Assignee: MICRO FOCUS LLC, Santa Clara, CA (US)

(*) Notice: Subject to any disclaimer, the term of this patent is extended or adjusted under 35 U.S.C. 154(b) by 333 days.

(21) Appl. No.: 15/750,645

(22) PCT Filed: Aug. 6, 2015

(86) PCT No.: PCT/US2015/044071
§ 371 (c)(1),
(2) Date: Feb. 6, 2018

(87) PCT Pub. No.: WO2017/023335
PCT Pub. Date: Feb. 9, 2017

(65) Prior Publication Data
US 2019/0026337 A1  Jan. 24, 2019

(51) Int. Cl.
*G06F 16/00*  (2019.01)
*G06F 16/2453*  (2019.01)
*G06F 16/2452*  (2019.01)

(52) U.S. Cl.
CPC .. *G06F 16/24544* (2019.01); *G06F 16/24524* (2019.01); *G06F 16/24535* (2019.01); *G06F 16/24542* (2019.01)

(58) Field of Classification Search
CPC ......... G06F 16/24544; G06F 16/24542; G06F 16/24535; G06F 16/24524; G06F 16/00; G06F 17/00; G06F 17/30; G06F 16/24537
See application file for complete search history.

(56) References Cited

U.S. PATENT DOCUMENTS 5,412,804 A * 5/1995 Krishna ............ G06F 16/24544
5,629,094 A * 5/1997 Sakakibara .............. G03G 7/00
                                                      399/388

(Continued)

FOREIGN PATENT DOCUMENTS

WO   WO2014093951 A2   6/2014

OTHER PUBLICATIONS

ISR/WO—PCT/IJS2015/044071—filed Aug. 6, 2015—8 pages daled May 2, 2016.

(Continued)

*Primary Examiner* — Anh Ly

(57) ABSTRACT

In some examples, a system includes query path determination circuitry to identify an aggregate projection to consider for generating a query path for the query. The aggregate projection may include an aggregated value calculated from a table column of a database table using an aggregate function. The query path determination circuitry may further be to compare candidate query paths for the query derived using the aggregate projection with candidate query paths for the query derived using a non-aggregate projection, determine a selected query path among the candidate query paths derived using the aggregate projection and the non-aggregate projection and use the selected query path as part of the query path for handling the query.

20 Claims, 8 Drawing Sheets

(56) References Cited

U.S. PATENT DOCUMENTS

| | | | | |
|---|---|---|---|---|
| 5,822,748 | A * | 10/1998 | Cohen | G06F 16/24537 |
| 5,905,982 | A * | 5/1999 | Carey | G06F 16/289 |
| | | | | 707/694 |
| 6,199,063 | B1 * | 3/2001 | Colby | G06F 16/24539 |
| 6,567,804 | B1 | 5/2003 | Ramasamy et al. | |
| 6,694,311 | B1 | 2/2004 | Smith | |
| 6,947,770 | B2 * | 9/2005 | Rydbeck | H04M 1/2748 |
| | | | | 455/564 |
| 8,086,598 | B1 * | 12/2011 | Lamb | G06F 16/24544 |
| | | | | 707/714 |
| 8,285,859 | B2 | 10/2012 | Boldyrev et al. | |
| 8,290,931 | B2 * | 10/2012 | Hong | G06F 16/284 |
| | | | | 707/713 |
| 2003/0172059 | A1 * | 9/2003 | Andrei | G06F 16/24554 |
| 2004/0220908 | A1 | 11/2004 | Finlay et al. | |
| 2007/0219976 | A1 * | 9/2007 | Muralidhar | G06F 16/40 |
| 2008/0046474 | A1 * | 2/2008 | Sismanis | G06F 16/217 |
| 2009/0106746 | A1 * | 4/2009 | Chaudhuri | G06F 8/20 |
| | | | | 717/158 |
| 2009/0276403 | A1 | 11/2009 | Tamayo et al. | |
| 2010/0125565 | A1 * | 5/2010 | Burger | G06F 16/24542 |
| | | | | 707/713 |
| 2010/0131490 | A1 * | 5/2010 | Lamb | G06F 16/24542 |
| | | | | 707/714 |
| 2010/0145929 | A1 * | 6/2010 | Burger | G06F 16/24545 |
| | | | | 707/713 |
| 2011/0213766 | A1 * | 9/2011 | Hong | G06F 16/284 |
| | | | | 707/718 |
| 2013/0173528 | A1 * | 7/2013 | Betawadkar-Norwood | |
| | | | | G06F 16/24535 |
| | | | | 707/602 |
| 2013/0185280 | A1 | 7/2013 | Ma et al. | |
| 2014/0156636 | A1 * | 6/2014 | Bellamkonda | G06F 16/24556 |
| | | | | 707/718 |
| 2016/0378827 | A1 * | 12/2016 | Bondalapati | G06F 16/24556 |
| | | | | 707/718 |

OTHER PUBLICATIONS

U, V., et aL, A Federated Query Answering System for Semantic Web Data, 2013, These and Dissertations, Lehigh University, 221 pages.

Wu, W. et aL, Predicting Query Execution Time: Are Optimizer Cost MOdels Really Unusable?, Jul. 23, 2012, Retrieved from the Internet: http://citeseerx.ist.psu.edu/viewdoc/download?doi=10.1.1.414.8128&rep=rep1&type=pdf.

Zhao, P., et at, On Graph Query Optimit.ation in large Networks, Sep. 13-17, 20-rn, Prnceedfngs of the VLDB Endowment vol. 3, No. 1, pp. 340 351.

* cited by examiner

QUERY PATH WITH AGGREGATE PROJECTION

BACKGROUND

Recent advances in technology have spurred the generation and storage of immense amounts of data. For example, web search engines support searching of huge amounts of data scattered across the Internet. Corporations may generate immense amounts of data through financial logs, e-mail messages, business records, and the like. As technology continues to develop, search and analysis of relevant data among large data sources may become increasingly difficult. Increasing the efficiency of data search technologies may improve user experience.

BRIEF DESCRIPTION OF THE DRAWINGS

Certain examples are described in the following detailed description and in reference to the drawings.

DETAILED DESCRIPTION

Figure 1:
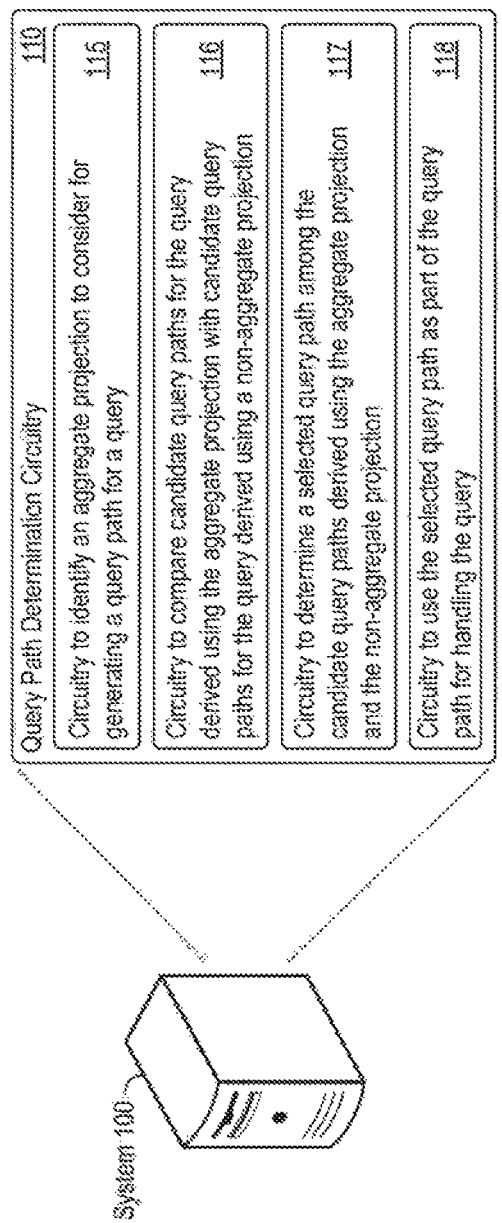
FIG. 1 shows an example of a system that supports generation a query path With an aggregate projection.

The discussion below refers to projections. A projection may refer to a data set of any number of table columns. A projection may take the form of a collection of pre-sorted columns that may contain some or all of the columns of one or more tables. In that regard, a projection may store the data values for one ore table columns, including table columns from a single database table or from multiple databases tables. Thus, a database query may be performed by accessing a projection to retrieve data values stored in the projection or by joining the projection with other projections to collect the data queried by the query.

One particular projection type referenced herein is art aggregate projection (or live aggregate projection). An aggregate projection may refer a projection that includes columns whose data values have been calculated from columns in a table. Data values for the aggregate projection may be calculated from any number of functions, examples of which include average, sum, minimum, maximum, count, and various other aggregate functions. In some examples aggregate projections also include group-by or partition-by expressions to arrange the calculated data values. Thus, an aggregate projection may include aggregated value(s) calculated from a table column using an aggregate function.

Since an aggregate projection includes pre-calculated data, using an aggregate projection to service or execute a query for data may support quicker and more efficient data retrieval. As one illustrative example an aggregate projection may take the form of:

create projection (a, b, c,) aggp as
select a, b, sum (c) from t group by a, b;

The example aggregate projection above may support quicker data retrieval or mess for data queries as compared to non-aggregate projections, because the data stored in the aggregate projection is already pre-sorted or pre-calculated. Thus, the example aggregate projection above may support more efficient data access for the following queries:

select a, b, sum (c) from t group by a, b;
select a, sum (c) from t group by a;
and
select sum (c) from t;

One particular type of an aggregate projection is a top-k projection. A top-k projection may refer to a projection that retrieves or includes the top "k" number of rows from a partition of selected rows. Thus, examples of top-k projections include:

create projection (a, b, c, d, e) topk as
select a, b, d, e from t limit 3 over (partition by a, b order by c,d);

The example top-k projection above may support quicker data retrieval or access for data queries as compared to non-aggregate projections, such as for the following queries:

select a, b, c, de, e, from t limit 1 over (partition by a, b, order by c,d)
and
select a, c, e, from t limit 2 over (partition by a order by c);

While some example aggregate projections are provided above, numerous other possibilities exist. For example, aggregate projections may include computations or calculations (e.g. including +1 or *2 or other mathematical expressions).

The discussion herein may provide for systems, methods, devices, rout and logic that support generating a query path that includes an aggregate projection. A query path may refer to an execution order for a query to retrieve data. The query path may include an order by which various tables, projections, or columns are joined or accessed. The query path may also include, when aggregate functions, group-by expressions, or other expressions or calculations specified in the query are executed. In particular, the features described herein may support using aggregate projections as part of query paths, which may decrease computational costs and increase the speed and efficiency by which a query executed.

For instance, query path determination circuitry may evaluate and compare various query paths derived from aggregate projections and non-aggregate projections to determine a selected query path, selected based on any number of path cost criteria. Thus, the query path determination circuitry may evaluate aggregate projections in query path determinations, and use an aggregate projection instead of a non-aggregate projection when doing so would reduce query costs. In some examples, the query path determination circuitry may support automatic consideration, evaluation, and use of aggregate projections as part of a query path to decrease query cost and execution time, thus supporting quicker and more efficient data retrieval.

FIG. 1 shows an example of a system 100 that supports generation of a query path with an aggregate projection. The system 100 may take the form of any computing device or set of computing devices that retrieves, accesses, or otherwise processes data. The system 100 may include query path determination circuitry 110. The system 108 may implement the query path determination circuitry 110 as any combination of hardware, dedicated circuitry, sub-systems, modules, logic, processors, executable instructions stored on a machine-readable medium, and more.

In operation, the query path determination circuitry 110 may determine a query path to handle a query. In that regard, the query path determination circuitry 110 may evaluate candidate query paths for the query that include aggregate projections, to possibly take advantage of the pre-aggregated or pre-calculated data stored by an aggregate projection. As described in greater detail below, the query path determination circuitry 110 may consider aggregate projections along with non-aggregate projections (e.g., regular projections that do not include pre-aggregated or pre-calculated data) and identify candidate query paths derive from aggregate projections, non-aggregate projections, or combinations of both. Then, the query path determination circuitry 110 may select a particular candidate query path for handling a query, e.g., according to path cost criteria applied by the query path determination circuitry 110.

As one example, the query path determination circuitry 110 shown in FIG. 1 includes the circuitries 115, 116, 117, and 118. Through the circuitries 116, 117, and 118, the query path determination circuitry 110 may identify an aggregate projection to consider for generating a query path for the query, wherein the aggregate projection includes an aggregated value calculated free table column of a database table using an aggregate function; compare candidate query paths for the query derived using the aggregate projection with candidate query paths for the query derived using a non-aggregate projection; determine a selected query path among the candidate query paths derived using the aggregate projection and the non-aggregate projection; and use the selected query path as part of the query path for handling the query. These and other features of the query path determination circuitry 110 are described in greater detail next.

Figure 2:
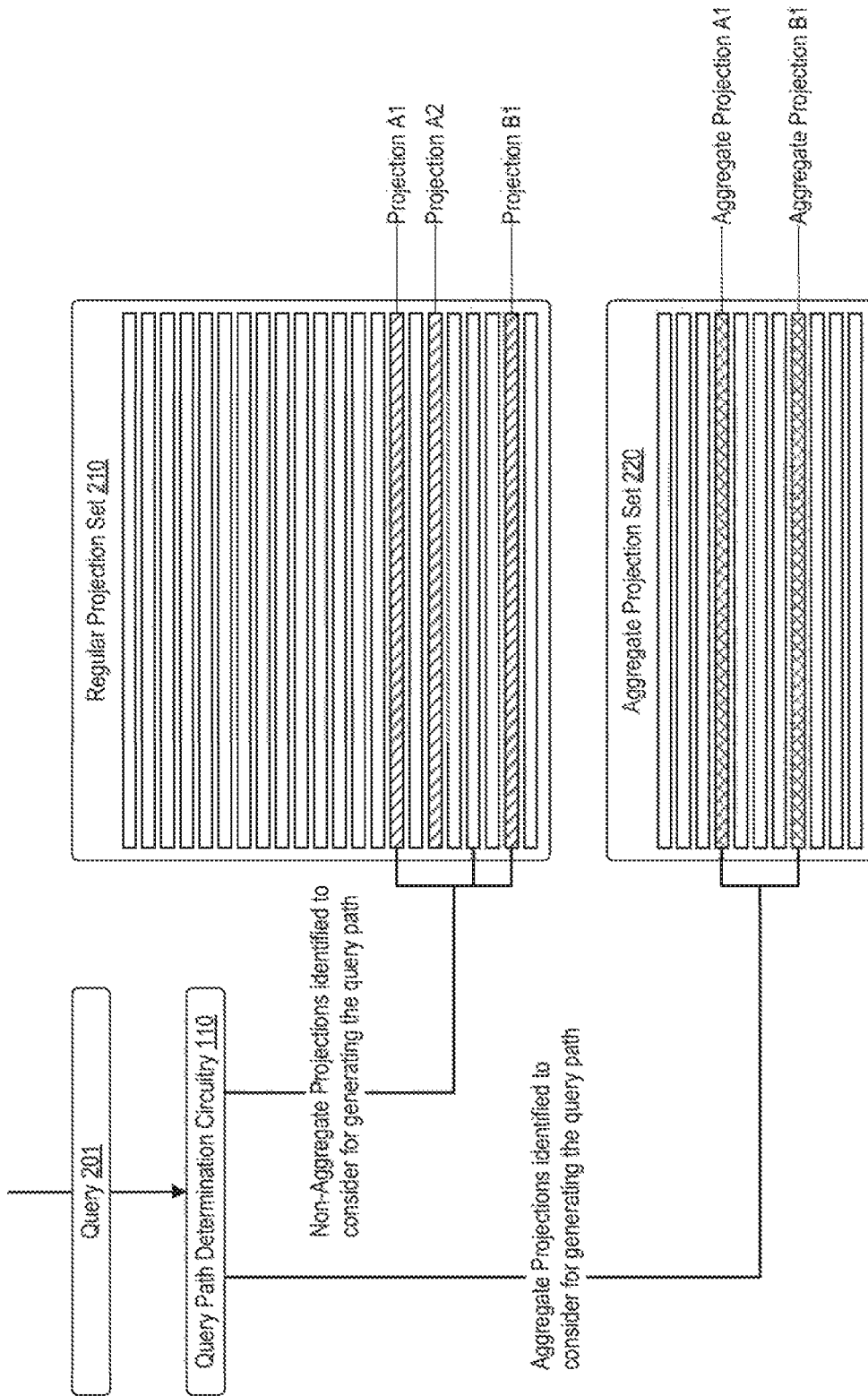
FIG. 2 shows an example of projection identification by query path determination circuitry.

FIG. 2 shows an example of projection identification by the query path determination circuitry 110. The query path determination circuitry 110 may receive a query 201. The query 201 may take the form of any data query and may be expressed through the structured query language (SQL) or any other data access language. To process the query 201, the query path determination circuitry 110 may determine a query path for query 201, and in doing so consider aggregate projections for including as part of the query path.

The query path determination circuitry 110 may identify projections to consider for generating the query path for the query 201. In some examples, the query path determination circuitry 110 identifies both aggregate and non-aggregate projections to consider, evaluate, or compare when generating the query path for the query 201. The query path determination circuitry 110 may apply any number of consideration criteria to identify candidate projections to consider for generating the query path. For instance, the query path determination circuitry 110 may identify a particular projection to consider for generating a query path when each table column of a particular database table referenced in the query 201 is also referenced in the projection. Put another way, the query path determination circuitry 110 may identify a candidate projection when the candidate projection covers each of the expressions of a particular table referenced in the query 201. As such, the query path determination circuitry 110 may identify candidate projections to consider on a table-by-table basis.

To illustrate with respect to FIG. 2, the query 201 may reference a table A and table B (or table columns thereof). The query path determination circuitry 110 may identify a non-aggregate (e.g., regular) projection when the non-aggregate projection includes each of the table columns of either table A or table B referenced in the query 201, in the example shown in FIG. 2, the query path determination circuitry 110 identifies non-aggregate projections to consider for generating the query path of the query from the regular projection set 210, and in particular identifies the projections A1 and A2 for table A and projection B1 for table B. The query path determination circuitry 110 may do so because projections A1 and A2 cover the table column(s) of table A referenced in the query 201 and projection B1 covers the table column(s) of table B referenced in the query 201.

The query path determination circuitry 110 may also identify aggregate projections to consider for generating the query path for the query 201. The query path determination circuitry 110 may identify aggregate projections to consider from the aggregate projection set 220. The aggregate projection set t nay include various user-specified or system-generated aggregate projections, for example. To identify an aggregate projection for consideration, the query path determination circuitry 110 may determine that the aggregate projection references each of the table columns referenced in table A or table B of the query 201. In some examples, the query path determination circuitry 110 may identify an aggregate projection for consideration in generating the query path when each expression referencing a particular table in the query 201 (e.g., table A or table B) is derived from a group-by clause or aggregate function in the aggregate projection. In the example shown in FIG. 2, the query path determination circuitry 110 identifies the aggregate projection A1 for table A and aggregate projection B1 for table B. The non-aggregate projections A1, A2 and B1 as well as the aggregate projections A1 and B1 are used as continuing examples in the description that follows.

The query path determination circuitry 110 may apply stricter consideration criteria for identifying specific types of aggregate projections for consideration, such as a top-K projection. For top-K projections, the query path determination circuitry 110 may identify top-K projection for consideration to include in the query path when each of the expressions on a particular table in the query 201 are derived from a top-K expression in the top-K projection and a partition-by or order-by expression in the query 201 is the same or a subset of the expression of the top-K projection. As another example of a consideration criterion, the query path determination circuitry 110 may consider a top-k projection for the query path when a filter in the query 201 only includes a partition-by expression.

Upon identifying candidate aggregate and non-aggregate projections for the query 201, the query path determination circuitry 110 may identify query paths derived using the candidate projections. The query path determination circuitry 110 may generate join graphs using combinations of tables referenced in the query 201 and candidate projections covering the referenced tables. A join graph may refer to any data structure that specifies tables and/or projections as vertices and join operations as edges, thus indicating which tables or projections are to be joined for a particular query. Through the generated join graphs, the query path determination circuitry 110 may identify candidate query paths as join orders of the generated join graphs.

Figure 3:
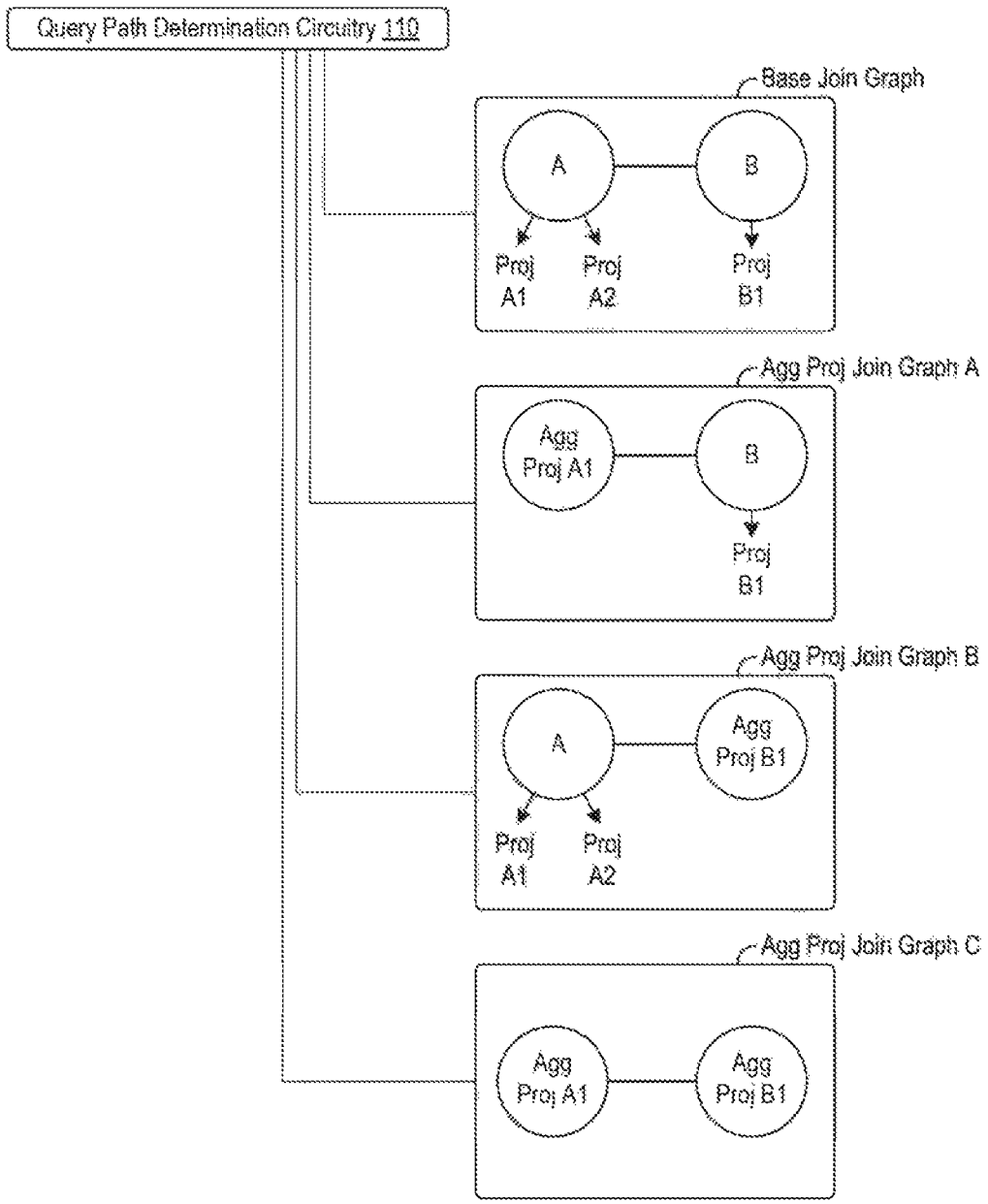
FIG. 3 shows an example of join graph generation by the query path determination circuitry.

FIG. 3 shows an example of join graph generation by the query path determination circuitry 110. The query path determination circuitry 110 may generate a base join graph, which may join tables referenced in the query 201. Continuing the illustration from FIG. 2, the query 201 may include references to or expressions on table A and table B.

In this illustration, the query path determination circuitry 110 may generate a base join graph to include table A and B, e.g., as shown in FIG. 3. For the base join graph, the query path determination circuitry 110 may identify non-aggregate projections covering the references to tables A and B in the query 201, shown as Proj A1 and A2 and Proj B1 in FIG. 3 (and corresponding to projections A1, A2, and B1 respectively in FIG. 2).

The query path determination circuitry 110 may also generate aggregate projection join graphs, which may refer to a join graph that substitutes a table from the base join graph with an aggregate projection. The query path determination circuitry 110 may generate multiple aggregate projection join graphs by enumerating through various combinations of tables from the base join graph, and candidate aggregate projections. For an exhaustive enumeration, the query path determination circuitry 110 may generate join graphs covering each combination for tables A, B, C, . . . N referenced in a query and their respective candidate, aggregate projections. That is, the query path determination circuitry 110 may enumerate through the combinations of Table A (candidate aggregate projections A1, A2, . . . $A_x$), Table B (candidate aggregate projections B1, B2, . . . $B_y$), . . . Table N (candidate aggregate projections N1, N2, . . . $N_z$) for a query referencing N number of tables, each table with a particular number of candidate aggregate projections covering the table columns referenced in the query. To generate an aggregate join graph from the base join graph, the query path determination circuitry 110 may replace expressions in the base join graph matching an expression from an aggregate projection with the particular corresponding column(s) from the aggregate projection.

In the example shown in FIG. 3, the query path determination circuitry 110 enumerates through the various combinations for Table A and B and their respective candidate aggregate projections to generate the base join graph and agate projection join graphs A, B, and C (shown as Agg Proj Join Graphs in FIG. 3). Thus, for aggregate projection join graph A, the query path determination circuitry 110 uses the aggregate projection A1 instead of table A, while keeping table B. To generate the aggregate projection join graph B, the query path determination circuitry 110 replaces table B with aggregate projection B1 while keeping table A. For aggregate projection join graph C, the query path determination circuitry 110 replaces both tables A and B with aggregate actions A1 and B1 respectively.

The number of join graphs generated by the query path determination circuitry 110 may vary depending on the number of candidate non-aggregate and aggregate projections identified for a particular query. As the number of identified projections increases, the query path determination circuitry 110 may generate an increased number of join graphs to enumerate through the various table-aggregate projection combinations, for instance to generate join graphs exhaustively covering the combinations between the referenced tables and to aggregate projections.

In some examples, the query path determination circuitry 110 limits the number of join graphs generated. In particular, the query path determination circuitry 110 may generate a base join graph and some, but not all, of the possible aggregate join graphs. To do so, the query path determination circuitry 110 may generate join graphs according to a memory-imposed limit, e.g., such that the generated join graphs do not consume more than a threshold amount of memory or exceed a total data size. As another feature, the query path determination circuitry 110 generate up to threshold number of join graphs, which may be a configurable upper limit set by a system administrator or other management entity.

To limit the number of generated join graphs, the query path determination circuitry 110 may determine to generate aggregate join graphs using selected aggregate projections among the identified candidate aggregate projections for a query. In that regard, the query path determination circuitry 110 may evaluate the identified candidate aggregate projections (e.g., covering a particular table) and prune or discard some of the aggregate projections from consideration.

The query path determination circuitry 110 may apply any number of criteria or heuristics to identify lower-cost aggregate projections for executing the query with lower cost or increased efficiency. For instance, the query path determination circuitry 110 may select the top "X" number of identified candidate aggregate projections for a particular table, ranked in increasing order based on the number of rows in the aggregate projection (as the lesser the number of rows, the lesser cost or resource consumption may be for accessing or operating on the aggregate projection). Thus, the query path determination circuitry 110 may generate join graphs, including a base join graph and aggregate projection join graphs.

Figure 4:
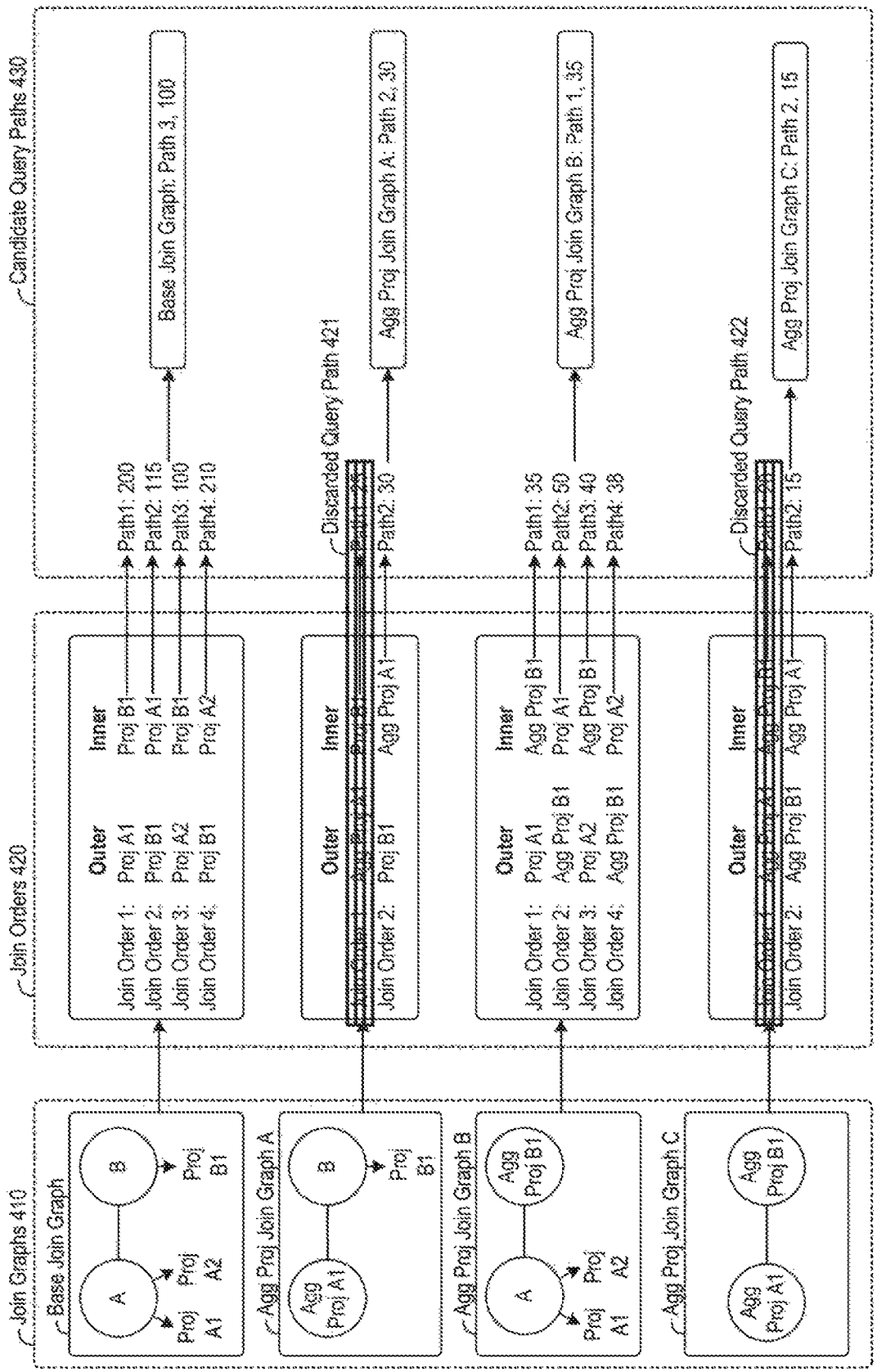
FIG. 4 shows an example of query path selection by the query path determination circuitry.

FIG. 4 shows an example of query path selection by the query path determination circuitry 110. To select a query path for a query (e.g., the query 201), the query path determination circuitry 110 may determine join orders for generated join graphs. FIG. 4 continues the ongoing illustration with respect to the query 201, and the query path determination circuitry 110 may identify the join orders for the join graphs 410, which include the base join graph, and aggregate projection join graphs A, B, and C. To identify the join orders of a join graph, the query path determination circuitry 110 may identify the combinations of joins possible for the join graph.

For the base join graph, the query path determination circuitry 110 identifies four different join orders, with combinations of the projections A1, A2, and B1 as outer and inner joins in a join order. As also seen in FIG. 4, the query path determination circuitry identifies two join orders for the aggregate projection join graph A, four join orders for the aggregate projection join graph B, and two join orders for the aggregate projection join graph C. As such, the query path determination circuitry 110 may determine the join orders 420 identified from the join graphs 410. Together, the join orders identified by the query path determination circuitry 110 are shown as the join orders 420 in FIG. 4. A join order may correspond to a particular path (or path portion) by which a query is executed. Thus, the query path determination circuitry 110 may recognize identified join orders as query paths through which the query 201 may be executed.

Upon identifying join orders 420 from the join graphs 410 of a query, the query path determination circuitry 110 may prune or discard particular join orders from consideration for including in the query path of a query. For instance, with a determined join order including an aggregate projection, the query path determination circuitry 110 may determine whether the join order can be transformed to increase query efficiency.

One such transformation for which the query path determination circuitry 110 may evaluate for is a group-by pushdown transformation, which may refer to transforming a join order to push a group-by expression further down the execution sequence of the join order. Doing so may result in earlier execution of a group-by expression, which may increase efficiency and reduce resource consumption. When a particular join order including an aggregate projection cannot be transformed by a group-by pushdown transformation, the query path determination circuitry 110 may discard the join order from consideration in generating the query path for the query. In the example shown in FIG. 4, the query path determination circuitry 110 discards join orders in which aggregate projection A1 is ordered as an outer join, shown as the discarded query paths 421 and 422 in FIG. 4. The query path determination circuitry 110 may do so because one or more group-by expressions in join orders and query paths with aggregate projection A1 as an outer join cannot be pushed down (e.g., earlier) in the execution sequence.

As another example, the query path determination circuitry 110 may apply specific discard criteria to particular projection types, such as top-k projections. The query path determination circuitry 110 may discard, from consideration as the selected query path, a particular query path derived using the top-k projection when a query limit specified in the query exceeds the "k" number of rows of the top-k projection. In this case, the query path determination circuitry 110 may recognize that the query requires retrieving more rows of data than the "k" number of data rows provided by the top-k projection. Thus, in this case, the top-k projection may be insufficient to retrieve the requested data for the query and the query path determination circuitry 110 may discard a join order or candidate query path including the top-k projection.

As a join order may correspond to a query path (or sub-path), the query path determination circuitry 110 may identify candidate query paths 430 as the identified join orders of the generated join graphs. FIG. 4 shows various candidate query paths identified by the query path determination circuitry 110, including those labeled as paths 1-4 identified from the base join graph, paths 1-2 identified from aggregate projection join graph A (from which path 1 is discarded as shown in FIG. 4 as the discarded query path 421), paths 1-4 identified from aggregate projection join graph B, and paths 1-2 identified from aggregate projection join graph C (from which path 1 is discarded as show as the discarded query path 422).

The query path determination circuitry 110 may determine a selected query path from among the candidate query paths 430 to use as the query path (or as part of the full query path) for executing the query 201. To do so, the query path determination circuitry 110 may apply any number of path cost criterion in evaluating or comparing the candidate query paths. A path cost criterion may consider various cost factors in using a projection, such as the amount of rows, resource costs in aggregation computations (e.g., for non-aggregate projections), execution speed, or any other cost considerations. In FIG. 4, the query path determination circuitry 110 determines a path cost for the identified candidate query paths, listed beside each of the candidate query paths (e.g., a cost of 200 for path 1 of the base join graph).

The query path determination circuitry 110 may identify a selected query path for executing a query as a candidate query path that has not been discarded and with the lowest cost. In some examples, the query path determination circuitry 110 identifies a candidate query path for each of the join graphs, such as the particular candidate query path from each join graph with the lowest cost. Then, the query path determination circuitry 110 may compare the candidate query path from each of the join graphs to determine the selected query path.

To illustrate through FIG. 4, the query path determination circuitry 110 identifies path 2 from aggregate projection join graph C with a path cost of 15 as the selected query path. The query path determination circuitry 110 may do so after comparing path 2 of the aggregate projection join graph C with path 3 of the base join graph (cost of 100), path 2 of aggregate projection join graph A (cost of 30), and path 1 of aggregate projection join graph B (cost of 35). Thus, in any of the ways described above, the query path determination circuitry 110 may identify a selected query path for use in executing the query 201 by considering and evaluating candidate query paths derived using non-aggregate projections, aggregate projections, and combinations of both.

In some examples, the query path determination circuitry 110 may generate a query path for a query that includes one or more sub-queries within the query. In these examples, the query path generated by determination circuitry 110 may be referred to as a full query path that includes a sub-query path for a sub-query within the query. Some examples in which the query path determination circuitry 110 may generate sub-query paths and full query paths are described next in FIGS. 5 and 6.

Figure 5:
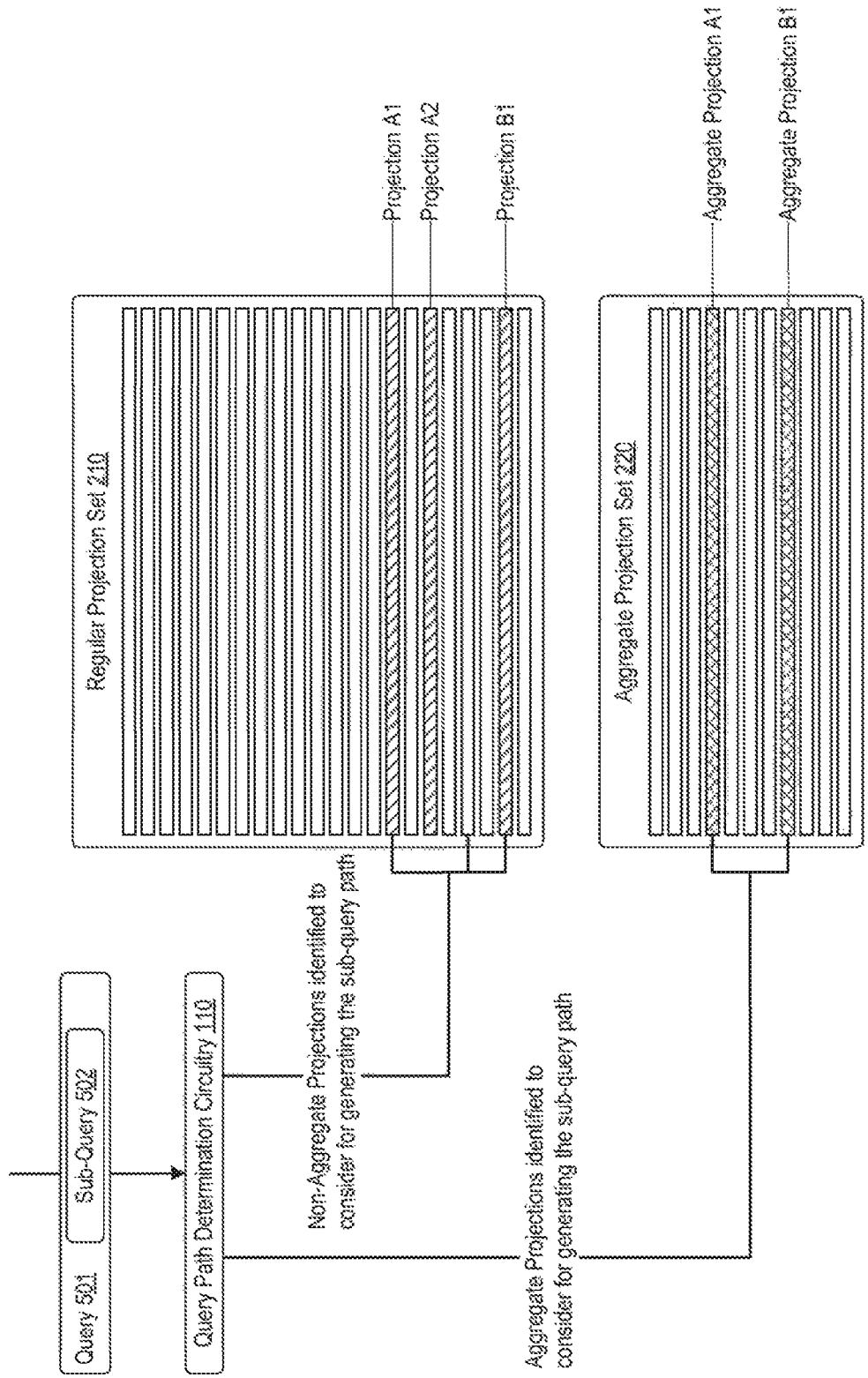
FIG. 5 shows an example of projection identification by the query path determination circuitry for a sub-query within a query.

FIG. 5 shows an example of projection identification by the query path determination circuitry 110 for a sub-query within a query. In FIG. 5, the query, path determination circuitry 110 receives a query 501 that includes a sub-query 502 within the query 501. The query path determination circuitry 110 may determine a full query path for the query 501 that includes a sub-query path for executing the sub-query 502. In the example shown in FIG. 5, the query path determination circuitry 110 identifies non-aggregate and aggregate projections to consider for generating the sub-query path for the sub-query 502, specifically identifying non-aggregate projections labeled as projection A1, A2, and B1 as well as the aggregate projections labeled as aggregate projection A1 and B1. Though not illustrated, the query path determination circuitry 110 may likewise identify projections (both aggregate and non-aggregate) to consider for generating other portions of e full query path, e.g., for other sub-queries or other portions of the query 501.

Figure 6:
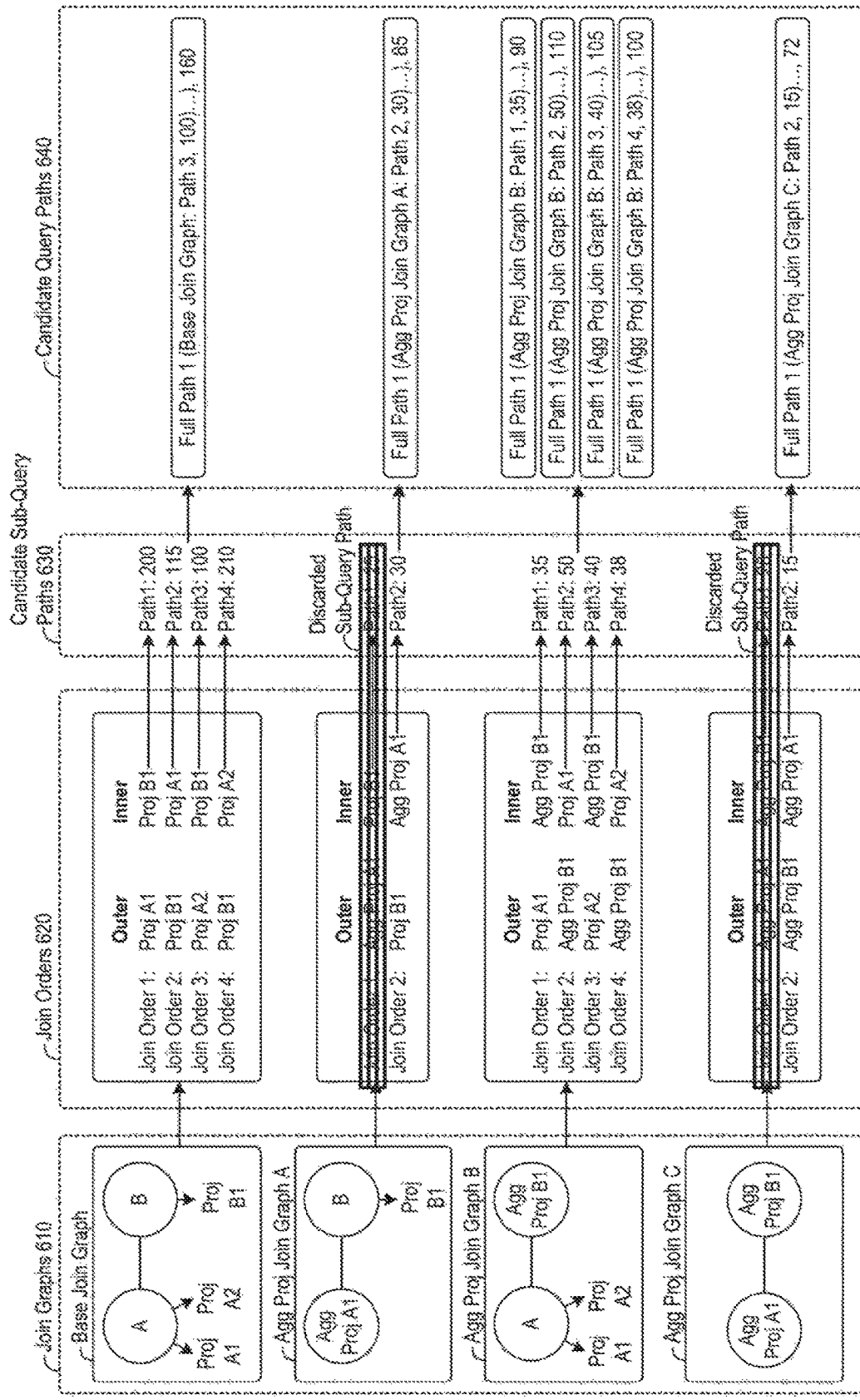
FIG. 6 shows an example of query path selection by the query path determination circuitry for a query including a sub-query.

FIG. 6 shows an example of query path selection by the query path determination circuitry 110 for a query including a sub-query. Specifically, FIG. 6 shows an example in which the query path determination circuitry 10 identifies candidate sub-query paths for the sub-query 502. Continuing the illustration from FIG. 5, the query path determination circuitry 110 may compare and evaluate candidate sub-query paths derived from the identified non-aggregate projections A1, A2, and B1 and the aggregate projections A1 and B1 for the sub-query 502. To do so, the query path determination circuitry 110 may generate the join graphs 610 and join orders 620, e.g., as similarly described above in FIG. 4. In identifying candidate sub-query paths, the query path determination circuitry 110 may discard sub-query paths (e.g., join orders) according to any number of discard criteria, such as a criterion based on group-by pushdown transformation as described above.

From the join orders, the query path determination circuitry 110 may identify candidate sub-query paths 630 for the sub-query 502. In some examples, the query path determination circuitry 110 may determine that one or more candidate sub-query paths cannot be fully evaluated without a context of a full query path. For instance, the query path determination circuitry 110 may apply a discard criterion to candidate sub-query paths that can be evaluated within the context of a full query path, but not with just the context of a sub-query path. This may be the case when the query path determination circuitry 110 generates a query path for a query that includes a top-k expression. In such a case, the value of "k" in the query expression may be unknown or undetermined until the full query context is determined. As such, the query path determination circuitry 110 may be unable to evaluate or discard candidate top-k projection(s) without the full query context (e.g., as the query path determination circuitry 110 cannot compare the "k" value of the candidate top-k projections until the "k" value the query expression is known in the full query context).

For candidate sub-query paths that cannot be evaluated without fuller query context, the query path determination circuitry 110 may identify multiple candidate sub-query paths to consider for a particular join graph. For instance, for the aggregate projection join graph B, the query path determination circuitry 110 may identify four candidate sub-query paths 630 to evaluate in the context of a full query path, e.g., instead of discarding the three candidate sub-query paths with higher path costs.

The query path determination circuitry 110 may determine candidate query paths 640, e.g., candidate full query paths for the query 501. In the context of the full query paths (e.g., with various join order and path combinations the full query), the query path determination circuitry 110 may compare and evaluate the candidate sub-query paths. As one example, the query path determination 110 may determine that a particular aggregate projection considered for the sub-query 502 may meet discard criteria in the full query context. In these examples the query path determination circuitry 110 may discard the candidate sub-query paths including the particular aggregate projection.

To illustrate, the query path determination circuitry 110 may determine, in the full query context of the candidate query paths 640, that the candidate sub-query paths derived from aggregate projection join graphs B and C meet the discard criterion (e.g., include top-k projections with a "k" value that are insufficient to service query with a top-k expression because the "k" value of the top-k projections is less than the "k" value of the top-k expression of the query). As such, the query path determination circuitry 110 may discard the candidate query paths that include sub-query paths of aggregate projection join graphs B and C. In this illustration, the query path determination circuitry 110 may determine a selected query path, for example, from among full path 1 from the base join graph and full path 1 from aggregate projection join graph A (e.g., the full path with the least cost).

Figure 7:
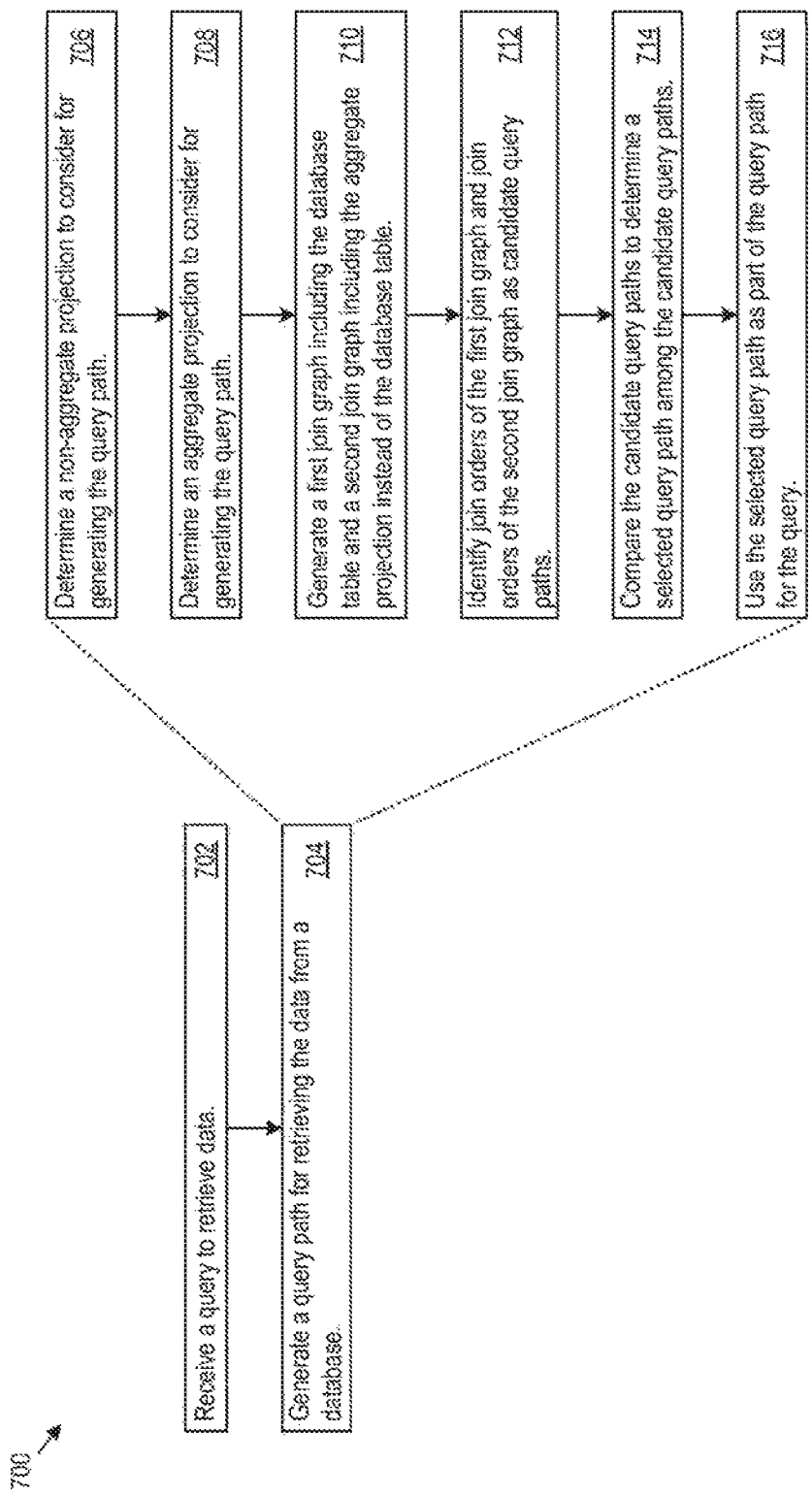
FIG. 7 shows an example of logic that the query path determination circuitry may generate.

FIG. 7 shows an example of logic 700 that the query path determination circuitry 110 may generate. The query path determination circuitry 110 may implement the logic 700 as hardware executable instructions stored on a machine-readable medium, or as combinations thereof. In some examples, the query path determination circuitry 110 performs or executes the logic 700 as a method or process to generate a query path with an aggregate projection.

The query path determination circuitry 110 may receive a query to retrieve data (702) and generate a query path for retrieving the data from a database (704). In that regard the query path may set an access or execution order to retrieve the data. To generate the query path, the query path determination circuitry 110 may determine a non-aggregate projection to consider for generating the query path (706). The non-aggregate projection may include data values from a table column of a database table referenced in the query. The query path determination circuitry 110 may also determine an aggregate projection to consider for generating the query path (708), and the aggregate rejection ray include an aggregated value calculated from the table column using an aggregate function.

In generating the query path, the query path determination circuitry 110 may generate a first join graph for the query including the database table and a second join graph for the query including the aggregate projection instead of the database table (710). Then, the query path determination circuitry 110 may identify join orders of the first join graph and join orders of the second join path as candidate query paths (712) and compare the candidate query paths to determine a selected query path among the candidate query paths (714). Then, the query path determination circuitry 110 may use the selected query path as part of the query path for the query (716). The query path determination circuitry 110 may identify the join orders as candidate query path, for example, and determine the selected join order according to any number of path cost criterion. The query path determination circuitry 110 may use the selected join order as the query path itself.

In comparing the candidate query paths, the query path determination circuitry 110 may identify a particular candidate query path from among the candidate query paths of the second join graph that does not support a group-by push-down transformation and discard the particular candidate query path from consideration as the selected query path. In some examples, the query path determination circuitry 110 compares the candidate query paths by applying a path cost criterion for the candidate query paths of the first join graph to identify a first candidate query path, applying the path cost criterion for the candidate query paths of the second join graph to identify a second candidate query path, and determining the selected query path from between the first candidate query path and the second candidate query path.

Figure 8:
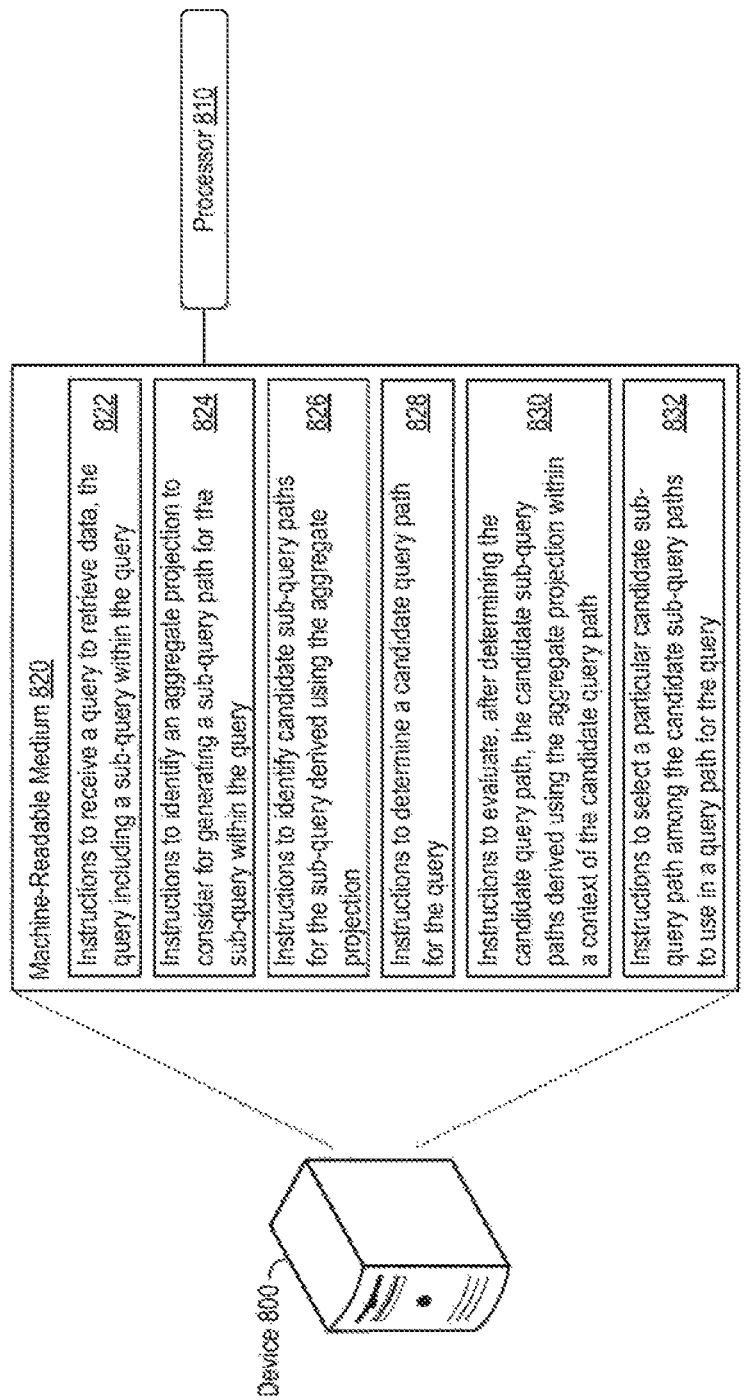
FIG. 8 shows an example of a device that supports generation of a query path with an aggregation projection.

FIG. 8 shows an example of a device 800 that supports generation of a query path with an aggregation projection. The device 800 may include a processor 810, and the processor 810 may include a central processing unit (CPU), microprocessor, or any hardware device suitable for executing instructions stored on a machine-readable medium. The device 800 may include a chine-readable medium 820. The machine-readable medium 820 may be any non-transitory electronic, magnetic, optical, or other physical storage device that stores executable instructions, such as the instructions 822, 824, 826, 828, 830, and 832 shown in FIG. 8. As such, the machine-readable medium 820 may be, for example, Random Access Memory (RAM), an Electrically-Erasable programmable Read-Only Memory (EEPROM), a storage drive, an optical disk, and the like.

The device 800 may execute instructions stored on the machine-readable medium 820 through the processor 810. Executing the instruction cause the device 800 to perform any combination of the query path generation features described herein, including according to any of the features of the query path determination circuitry 110. For example, executing the instructions 822, 824, 826, 828, 830, and 832 may cause the processor 810 to receive a query to retrieve data, the query comprising a sub-query within the query; identify an aggregate projection to consider for generating a sub-query path for the sub-query within the query, wherein the aggregate projection includes an aggregated value calculated using an aggregate function from a table column of a database table referenced in the sub-query; identify candidate sub-query paths for the sub-query derived using the aggregate projection: determine a candidate query path for the query, evaluate, after determining the candidate query path, the candidate sub-query paths derived using the aggregate projection within a context of the candidate query path; and select a particular candidate sub-query path among the candidate sub-query paths to use in a query path for the query.

The instructions 826 stored on the machine-readable medium 820 may cause the device 800 to identify the candidate sub-query paths for the sub-query derived using the aggregate projection by generating a join graph for the sub-query using the aggregate projection and identifying join orders for the join graph as at least some of the candidate sub-query paths derived using the aggregate projection, for example. As another example, the instructions 824 may cause the device 800 to identify the aggregate projection to consider for generating the sub-query path when each table column of a particular database table referenced in the sub-query is also referenced in the aggregate projection. As yet another example, the machine-readable medium 820 may further store instructions to executable instructions are further to identify candidate sub-query paths for the sub-query derived using a non-aggregate projection that includes data values from a table column of the database table referenced in the sub-query and compare the candidate sub-query paths derived using the non-aggregate projection with the candidate sub-query paths derived using the aggregate projection.

The systems, methods, devices, circuitry, and logic described above, including the query path determination circuitry 110, may be implemented in many different ways in many different combinations of hardware, logic, circuitry, and executable instructions stored on a machine-readable medium. For example, the query path determination circuitry 110 may include circuitry in a controller, a microprocessor, or an application specific integrated circuit (ASIC), or may be implemented with discrete logic or components, or a combination of other types, of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including any features of the query path determination circuitry 110.

The processing capability of the systems, devices, and circuitry described herein, including the query path determination circuitry 110, may be distributed among multiple system components, such as among multiple processors and memories, optionally including multiple distributed processing systems. Parameters, databases, and other data structures may be separately stored and managed, may be incorporated into a single memory or database, may be log and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various examples have been described above, many more implementations are possible.

The invention claimed is:

1. A method comprising:
receiving a query to retrieve data;
generating, by a processor, a query path for retrieving the data from a database by:
determining a non-aggregate projection that includes data values from a table column of a database table referenced in the query;
determining an aggregate projection that includes an aggregated value calculated from the table column of the database table referenced in the query;
generating a first join graph using the non-aggregate projection;
generating a second join graph using the aggregate projection;
identifying join orders of the first join graph as first candidate query paths derived from the non-aggregate projection;
identifying join orders of the second join graph as second candidate query paths derived from the aggregate projection;
comparing the first candidate query paths with the second candidate query paths to determine a selected query path for the query; and
retrieving, by the processor, the data from the database for the query using the selected query path.

2. The method of claim 1, wherein comparing the first candidate query paths with the second candidate query paths comprises:
identifying a particular candidate query path from among the second candidate query paths that does not support a group-by pushdown transformation; and
discarding the particular candidate query path from consideration as the selected query path.

3. The method of claim 1, wherein comparing the first candidate query paths with the second candidate query paths comprises:
applying a path cost criterion for the first candidate query paths to identify a first query path;
applying the path cost criterion for the second candidate query paths to identify a second query path; and
determining the selected query path from between the first query path and the second query path.

4. The method of claim 1, wherein identifying the aggregate projection comprises:
identifying a top-k aggregate projection that includes a top "k" number of rows from a partition of selected rows, wherein the top-k aggregation projection is identified when each expression on the database table referenced in the query is derived from a top-k expression in the top-k aggregate projection.

5. The method of claim 4, wherein comparing the first candidate query paths with the second candidate query paths comprises:
discarding, from consideration of the selected query path, the top-k aggregate projection when a query limit specified in the query exceeds the "k" number of rows of the top-k aggregate projection.

6. The method of claim 1, wherein the query references a column of a first table and a column of a second table,
wherein identifying the non-aggregate projection comprises: identifying a first non-aggregate projection that includes the column of the first table and a second non-aggregate projection that includes the column of the second table,
wherein generating the first join graph comprises: generating a base join graph using a combination of the first and second tables referenced in the query and the first and second non-aggregate projections, and
wherein generating the second join graph comprises: substituting the first table or the second table in the base join graph with the aggregate projection.

7. A system comprising:
a processor; and
a non-transitory machine readable medium storing instructions executable to cause the processor to:
receive a query;

identify an aggregate projection to consider for generating a query path for the query, wherein the aggregate projection includes an aggregated value calculated from a table column of a database table referenced in the query;

compare candidate query paths for the query derived from the aggregate projection with candidate query paths for the query derived from a non-aggregate projection to determine the query path for the query;

discard, from consideration as the query path, a particular query path derived from the aggregate projection when the particular query path does not support a group-by pushdown transformation; and retrieve data from a database for the query using the query path.

8. The system of claim 7, wherein the instructions are executable to cause the processor to:
generate a first join graph using the non-aggregate projection;
identify join orders for the first join graph as at least some of the candidate query paths derived from the non-aggregate projection;
generate a second join graph using the aggregate projection; and
identify join orders for the second join graph as at least some of the candidate query paths derived from the aggregate projection.

9. The system of claim 7, wherein the instructions are executable to cause the processor to:
identify the non-aggregate projection that includes the table column of the database table referenced in the query; and
generate a base join graph using a combination of the database table referenced in the query and the identified non-aggregate projection; and
generate one of the candidate query paths derived from the non-aggregate projection using the base join graph.

10. The system of claim 7, wherein the aggregate projection is a top-k aggregation projection that includes a top "k" number of rows from a partition of selected rows.

11. The system of claim 10, wherein the instructions are executable to cause the processor to discard, from consideration as the query path, one of the candidate query paths derived from the top-k aggregation projection when a query limit specified in the query exceeds the "k" number of rows of the top-k aggregation projection.

12. The system of claim 7, wherein the instructions are executable to cause the processor to identify the aggregate projection to consider for generating the query path when the table column of the database table referenced in the query is also referenced in the aggregate projection.

13. A non-transitory computer-readable medium storing executable instructions that cause a processor to:
receive a query to retrieve data, the query comprising a sub-query within the query;
identify an aggregate projection to consider for generating a sub-query path for the sub-query within the query, wherein the aggregate projection includes an aggregated value calculated from a table column of a database table referenced in the sub-query;
identify first candidate sub-query paths for the sub-query derived from the aggregate projection by:
generating a join graph for the sub-query using the aggregate projection, and
identifying join orders for the join graph as the first candidate sub-query paths derived from the aggregate projection;
determine a candidate query path for the query;
evaluate, after determining the candidate query path, the first candidate sub-query paths derived from the aggregate projection within a context of the candidate query path;
select a particular candidate sub-query path among the first candidate sub-query paths to use in a query path for the query; and
retrieve the data from a database using the query path that includes the particular candidate sub-query path.

14. The non-transitory computer-readable medium of claim 13, wherein the executable instructions cause the processor to:
identify a non-aggregate projection to consider for generating the sub-query path for the sub-query within the query, wherein the non-aggregate projection includes the table column of the database table referenced in the sub-query.

15. The non-transitory computer-readable medium of claim 14, wherein the executable instructions cause the processor to:
identify second candidate sub-query paths for the sub-query derived from the non-aggregate projection that includes the table column of the database table referenced in the sub-query; and
compare the second candidate sub-query paths derived from the non-aggregate projection with the first candidate sub-query paths derived from the aggregate projection.

16. The non-transitory computer-readable medium of claim 13, wherein the aggregate projection is a top-k aggregate projection that includes a top "k" number of rows from a partition of selected rows.

17. The non-transitory computer-readable medium of claim 16, wherein the executable instructions cause the processor to discard one of the first candidate sub-query paths that was derived from the top-k aggregate projection when a query limit specified in the query exceeds the "k" number of rows of the top-k aggregate projection.

18. The non-transitory computer-readable medium of claim 13, wherein the executable instructions cause the processor to identify the aggregate projection to consider for generating the sub-query path when the table column of the database table referenced in the sub-query is also referenced in the aggregate projection.

19. The non-transitory computer-readable medium of claim 13, wherein the sub-query references a column of a first table and a column of a second table, and
wherein the executable instructions cause the processor to:
identify a first non-aggregate projection that includes the column of the first table and a second non-aggregate projection that includes the column of the second table, and
generate a base join graph using a combination of the first and second tables referenced in the sub-query and the first and second non-aggregate projections.

20. The non-transitory computer-readable medium of claim 19, wherein, to generate the join graph using the aggregate projection, the executable instructions cause the processor to:
substitute the first table or the second table in the base join graph with the aggregate projection.

* * * * *